(12) United States Patent
Nojiri et al.

(10) Patent No.: US 11,620,098 B2
(45) Date of Patent: Apr. 4, 2023

(54) VEHICLE CONTROL DEVICE, VEHICLE, OPERATION METHOD FOR VEHICLE CONTROL DEVICE, AND STORAGE MEDIUM

(71) Applicant: HONDA MOTOR CO., LTD., Tokyo (JP)

(72) Inventors: Tsuyoshi Nojiri, Wako (JP); Takahiro Matsuoka, Wako (JP); Masayuki Sato, Wako (JP); Ryo Shimoe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/667,205

(22) Filed: Feb. 8, 2022

(65) Prior Publication Data
US 2022/0308820 A1    Sep. 29, 2022

(30) Foreign Application Priority Data
Mar. 25, 2021   (JP) .............................. JP2021-052010

(51) Int. Cl.
*G06F 3/14*    (2006.01)
*B60Q 3/78*    (2017.01)
(Continued)

(52) U.S. Cl.
CPC ............ *G06F 3/1423* (2013.01); *B60K 35/00* (2013.01); *B60Q 3/78* (2017.02); *G02B 27/0101* (2013.01);
(Continued)

(58) Field of Classification Search
CPC ......... G06F 3/1423; B60Q 3/78; B60K 35/00; B60K 2370/1529; B60K 2370/349; B60K 2370/52; B60K 2370/179; G02B 27/0101; G02B 2027/0118; G09G 3/3406; G09G 2320/0606; G09G 2320/0626;
(Continued)

(56) References Cited

U.S. PATENT DOCUMENTS 7,966,123 B2 * 6/2011 Watanabe .............. B60K 37/02
                                              340/439
10,071,631 B1    9/2018 Aizawa et al.
(Continued)

FOREIGN PATENT DOCUMENTS

JP         2018185413 A    11/2018

*Primary Examiner* — Doon Y Chow
(74) *Attorney, Agent, or Firm* — Thomas Horstemeyer, LLP

(57) ABSTRACT

A vehicle control device comprises: an acquisition unit configured to acquire information of outside brightness of the vehicle; and a control unit configured to control, based on the outside brightness, luminance of a plurality of display areas including a first display area displayed by a first display unit for displaying a situation of the vehicle and a second display area displayed by a second display unit for displaying a situation of the vehicle, the second display area being displayed below the first display area, wherein when the outside brightness is higher than a first threshold, the control unit suppresses luminance of the first display area in accordance with a decrease in the outside brightness, and when the outside brightness is equal to or lower than the first threshold, suppresses luminance of the second display area in accordance with the decrease.

18 Claims, 8 Drawing Sheets

(51) Int. Cl.
*B60K 35/00* (2006.01)
*G02B 27/01* (2006.01)
*G09G 3/34* (2006.01)

(52) U.S. Cl.
CPC .... *G09G 3/3406* (2013.01); *B60K 2370/1529* (2019.05); *B60K 2370/179* (2019.05); *B60K 2370/349* (2019.05); *B60K 2370/52* (2019.05); *G02B 2027/0118* (2013.01); *G09G 2320/0606* (2013.01); *G09G 2320/0626* (2013.01); *G09G 2320/0666* (2013.01); *G09G 2360/144* (2013.01); *G09G 2380/10* (2013.01)

(58) Field of Classification Search
CPC ..... G09G 2320/0666; G09G 2360/144; G09G 2380/10
See application file for complete search history.

(56) References Cited

U.S. PATENT DOCUMENTS

| | | | |
|---|---|---|---|
| 2015/0191085 A1* | 7/2015 | Schwantner | B60K 37/02 345/102 |
| 2016/0167514 A1* | 6/2016 | Nishizaki | B60K 35/00 345/7 |
| 2020/0105224 A1* | 4/2020 | Higashiyama | G02B 27/0101 |
| 2020/0168169 A1* | 5/2020 | Yoda | G02F 1/133603 |

* cited by examiner

ID # VEHICLE CONTROL DEVICE, VEHICLE, OPERATION METHOD FOR VEHICLE CONTROL DEVICE, AND STORAGE MEDIUM

CROSS-REFERENCE TO RELATED APPLICATION(S)

This application claims priority to and the benefit of Japanese Patent Application No. 2021-052010 filed on Mar. 25, 2021, the entire disclosure of which is incorporated herein by reference.

BACKGROUND OF THE INVENTION

Field of the Invention

The present invention relates to a vehicle control device, a vehicle, an operation method for the vehicle control device, and a storage medium.

Description of the Related Art

Japanese Patent Laid-Open No. 2018-185413 discloses that while warning information is displayed in a display area for displaying the warning information of a vehicle, the luminance of a backlight in the display area is increased.

In the technique disclosed in Japanese Patent Laid-Open No. 2018-185413, however, in a case where a plurality of display areas are arranged in the vehicle, in particular, when the outside is dark, there is a drawback that a visual attraction occurs due to an increased luminance in the display area on an upper side of the vehicle within the driver's visual field.

The present invention has been made in view of the above drawback, and provides a technique for improving visibility of the outside, in a case where a display area is present within a visual field of a driver.

SUMMARY OF THE INVENTION

According to one aspect of the present invention, there is provided a vehicle control device that controls a vehicle, the vehicle control device comprising: a luminance acquisition unit configured to acquire information of outside brightness of the vehicle; and a control unit configured to control, based on the outside brightness, luminance of a plurality of display areas including a first display area displayed by a first display unit for displaying a situation of the vehicle and a second display area displayed by a second display unit for displaying a situation of the vehicle, the second display area being displayed below the first display area, wherein in a case where the outside brightness is higher than a first threshold, the control unit suppresses luminance of the first display area in accordance with a decrease in the outside brightness, and in a case where the outside brightness is equal to or lower than the first threshold, the control unit suppresses luminance of the second display area in accordance with the decrease in the outside brightness.

DESCRIPTION OF THE EMBODIMENTS

Figure 1:
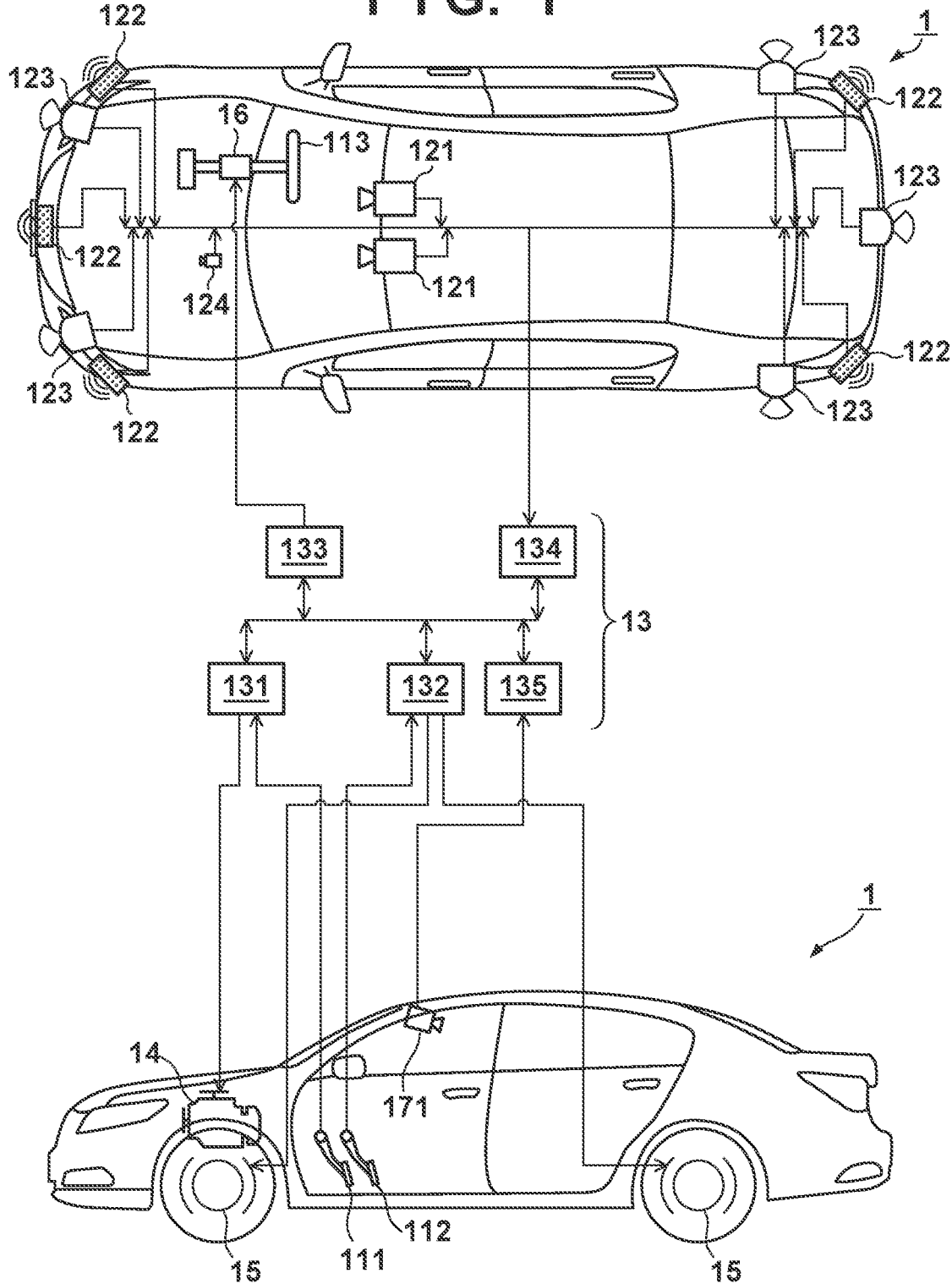
FIG. 1 is a diagram for describing a configuration example of a vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 2:
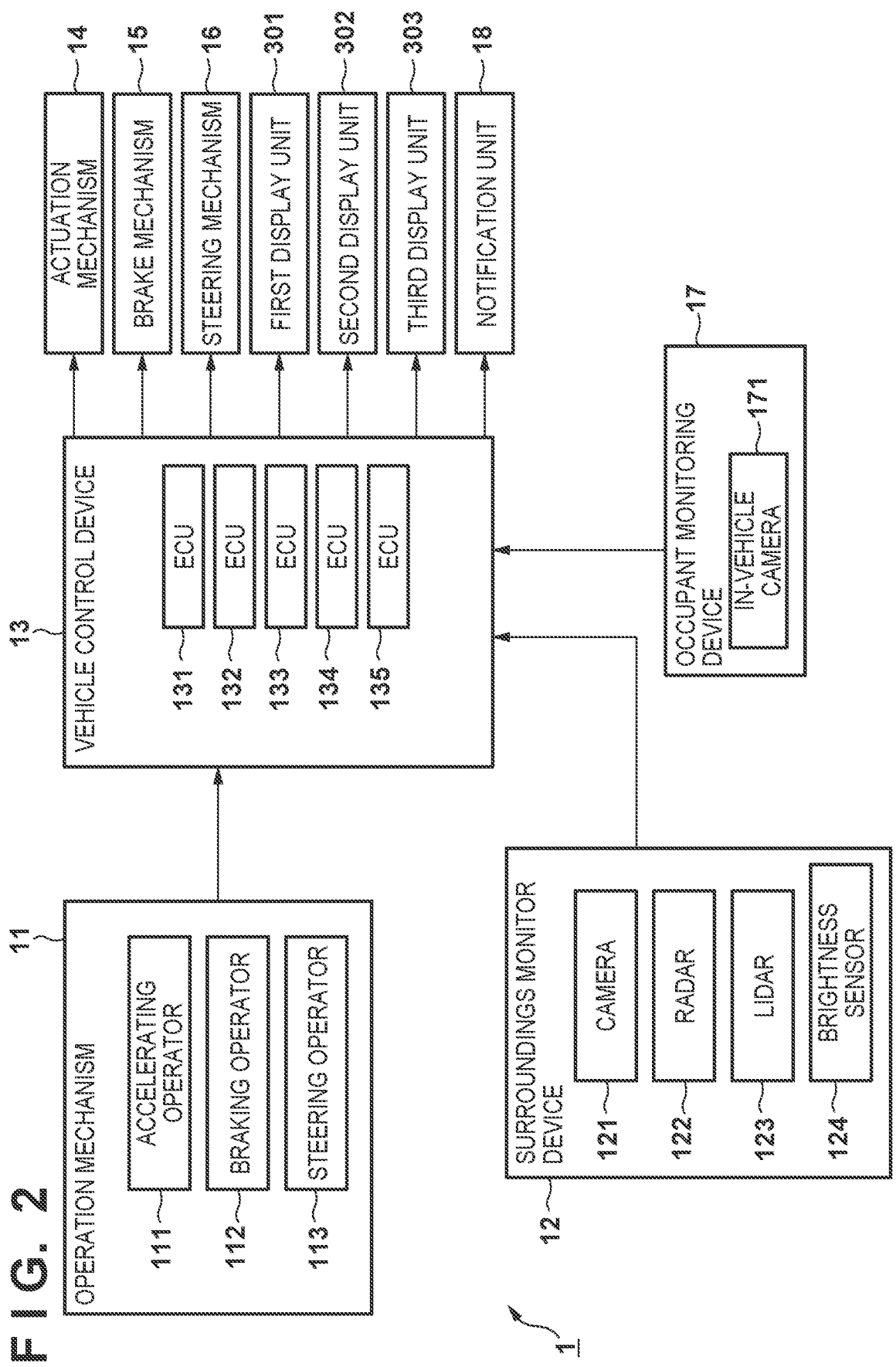
FIG. 2 is a block diagram for describing a configuration example of the vehicle according to an embodiment of the present invention.

<Vehicle Configuration>
FIGS. 1 and 2 are diagrams for describing a configuration of a vehicle 1 according to the present embodiment. FIG. 1 illustrates arrangement positions of elements to be described below and a connection relationship between the elements in a top view and a side view of the vehicle 1. FIG. 2 is a system block diagram of the vehicle 1.

Note that in the following description, expressions such as front/back, up/down, and lateral side (left/right) may be used as expressions indicating directions relative to the vehicle body of the vehicle 1. For example, the term "front" indicates the front side of the vehicle body in a front-and-rear direction, and the term "upper" indicates a height direction of the vehicle body.

As illustrated in FIG. 2, the vehicle 1 includes an operation mechanism 11, a surroundings monitoring device 12, a vehicle control device 13, an actuation mechanism 14, a brake mechanism 15, a steering mechanism 16, an occupant monitoring device 17, a first display unit 301, a second display unit 302, a third display unit 303, and a notification unit 18. Note that in the present embodiment, the vehicle 1 is a four-wheeled vehicle, but the number of wheels is not limited to this.

The operation mechanism 11 includes an accelerating operator 111, a braking operator 112, and a steering operator 113. Typically, the accelerating operator 111 is an accelerator pedal, the braking operator 112 is a brake pedal, and the steering operator 113 is a steering wheel. However, any other type such as a lever type, a button type, or the like may be used for the operators 111 to 113.

The surroundings monitoring device 12 includes a camera 121, a radar 122, and a light detection and ranging (LiDAR) 123, all of which function as sensors for monitoring or detecting surrounding environments of the vehicle (self-vehicle) 1. The camera 121 is an imaging device using, for example, a CCD image sensor, a CMOS image sensor, or the like. The radar 122 is, for example, a ranging device such as a millimeter wave radar. Further, the LiDAR 123 is, for example, a ranging device such as a laser radar. As illustrated in FIG. 1, these components are respectively disposed at positions where the surrounding environment of the vehicle 1 is detectable, for example, on a front side, a rear side, an upper side, and lateral sides of the vehicle body.

Examples of the surrounding environment of the vehicle 1 described above include a travel environment of the vehicle 1 and an environment in the surroundings of the vehicle 1 related to the travel environments (extending directions of lanes, travelable areas, colors of traffic signals, and the like), and object information in the surroundings of the vehicle 1 (the presence or absence of an object such as another vehicle, a pedestrian, and an obstacle, and an attribute, a position, a moving direction and speed, and the like of the object). From this viewpoint, the surroundings monitoring device 12 may be expressed as a detection device or the like for detecting and acquiring the surrounding information of the vehicle 1.

In addition, the surroundings monitoring device 12 includes a brightness sensor 124. The brightness sensor 124 is disposed, for example, below a windshield of the vehicle 1, and is directed in an upward direction through the windshield. The brightness sensor 124 is capable of acquiring outside brightness of the vehicle 1.

The vehicle control device 13 is capable of controlling the vehicle 1, and controlling the mechanisms 14 to 16, based on a signal from the operation mechanism 11 and/or the surroundings monitoring device 12, for example. The vehicle control device 13 includes a plurality of electronic control units (ECUs) 131 to 135. Each ECU includes one or more CPUs, one or more memories, and a communication interface. Each ECU reads one or more programs from one or more memories by one or more CPUs, based on information (data or electric signals) that has been received via the communication interface, and executes a process. Then, its process result is stored in one or more memories, or is output to another element via the communication interface.

The ECU 131 is an accelerating ECU, and controls the actuation mechanism 14, to be described later, based on, for example, an operation amount of the accelerating operator 111 by a driver. The ECU 132 is a braking ECU, and controls the brake mechanism 15, based on, for example, an operation amount of the braking operator 112 by the driver. The brake mechanism 15 is, for example, a disc brake provided on each wheel. The ECU 133 is a steering ECU, and controls the steering mechanism 16, based on, for example, an operation amount of the steering operator 113 by the driver. The steering mechanism 16 includes, for example, power steering.

The ECU 134 is an analyzing ECU provided to correspond to the surroundings monitoring device 12. The ECU 134 is capable of performing a predetermined analysis/process based on the surrounding environment of the vehicle 1 that has been acquired by the surroundings monitoring device 12, and outputting its result to the ECUs 131 to 133. The ECUs 131 to 133 are capable of controlling the mechanisms 14 to 16, based on a signal that has been acquired from the ECU 134. According to such a configuration, the vehicle control device 13 is capable of conducting travel control of the vehicle 1 in accordance with the surrounding environment.

In addition, the ECU 134 is capable of conducting a predetermined analysis/process based on the surrounding environment of the vehicle 1 that has been acquired by the surroundings monitoring device 12, and controlling display contents, display luminance, and the like of various display units provided in the vehicle 1. Furthermore, the ECU 134 is capable of controlling display contents, display luminance, and the like of various display units provided in the vehicle 1, by using information that has been acquired from the ECUs 131 to 133.

Furthermore, the ECU 134 is also capable of controlling an operation of the notification unit 18, and notifying the occupant of a warning or notifying the occupant of various types of information, by using, for example, voice and/or vibration.

The ECU 135 is an analyzing ECU provided to correspond to the occupant monitoring device 17. In the present embodiment, the occupant monitoring device 17 includes an in-vehicle camera 171 installed inside the vehicle, and is capable of acquiring a captured image inside a vehicle cabin of the vehicle 1, by using the in-vehicle camera 171. In addition, the ECU 135 receives such a captured image from the occupant monitoring device 17, and is capable of controlling the display contents, the display luminance, and the like of various display units provided in the vehicle 1, based on an analysis result of the captured image.

Note that the vehicle control device 13 is not limited to the illustrated configuration. For example, a semiconductor device such as an application specific integrated circuit (ASIC) may be used for each the ECUs 131 to 135. That is, functions of each the ECUs 131 to 135 are achievable by any of hardware or software. Some or all of the ECUs 131 to 135 may be configured with a single ECU. In addition, the vehicle control device 13 may include at least one of the surroundings monitoring device 12, the occupant monitoring device 17, and the notification unit 18.

<Arrangement Configuration of Display Unit>

Figure 3:
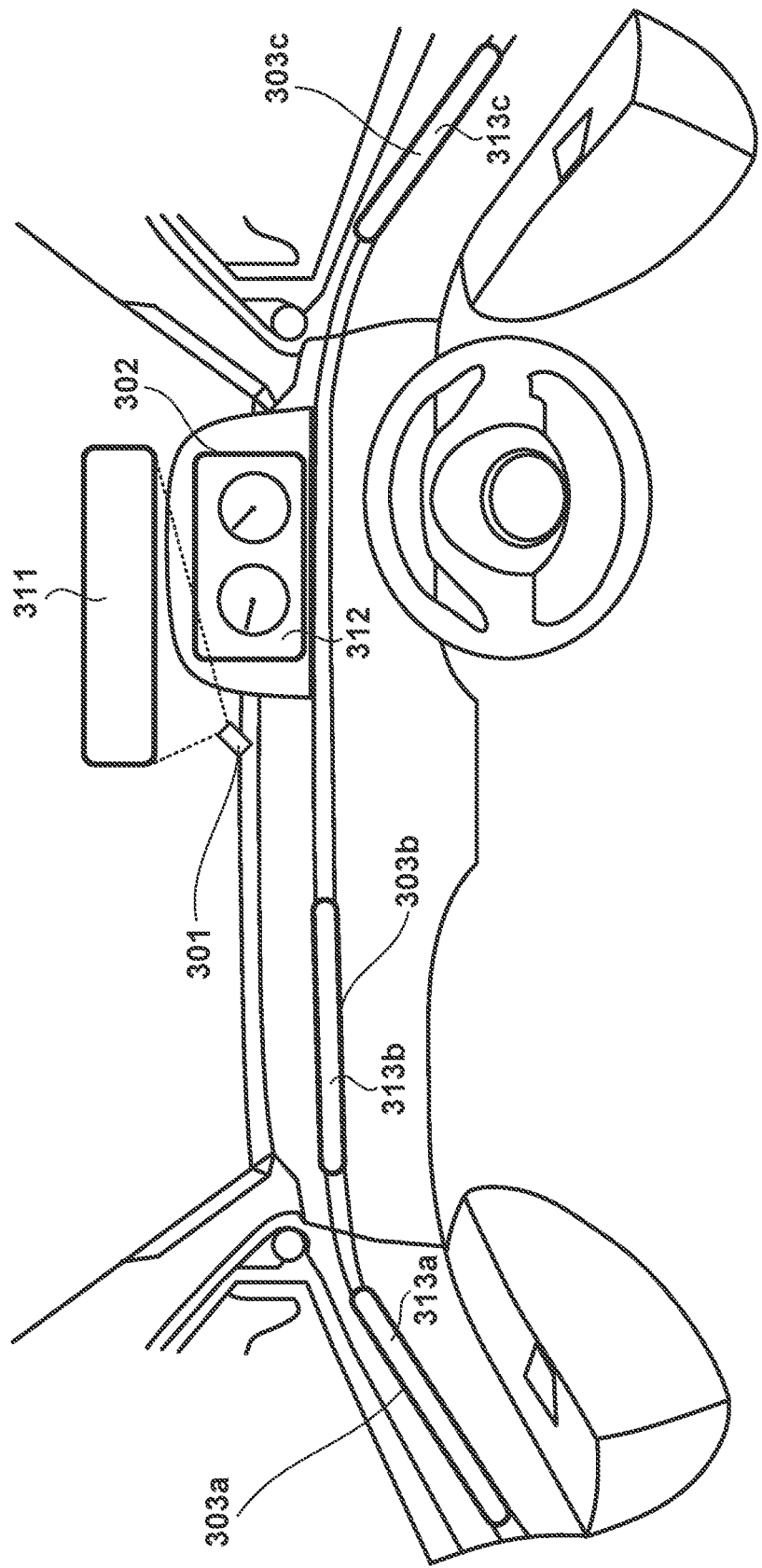
FIG. 3 is a diagram illustrating an example of an arrangement configuration of a display unit according to an embodiment of the present invention.

Here, with reference to FIG. 3, a description will be given with regard to an example of an arrangement configuration of the first display unit 301, the second display unit 302, and the third display unit 303 according to the present embodiment.

The first display unit 301 is, for example, a head-up display, and projects information on the windshield of the vehicle 1 to be capable of displaying a situation, a state, or the like of the vehicle 1 in the first display area 311. The second display unit 302 is, for example, a meter display unit, and includes a second display area 312. The second display area 312 is disposed below the first display area 311 in a vehicle vertical direction.

The third display unit 303 is, for example, an indoor light disposed in a periphery of the inside of the vehicle 1, extending in a horizontal direction, and disposed below the windshield. The third display unit 303 includes the third display units 303a to 303c for respectively displaying the third display areas 313a to 313c. However, its arrangement number or arrangement positions or the like of the third display units 303a to 303c are not limited to the illustrated example. The third display unit 303 is capable of lighting or blinking in various colors with various luminance variations. The third display areas 313a to 313c are disposed below the second display area 312 in the vehicle vertical direction.

When the outside is bright in daytime or in a good weather, the luminance of each display area of the vehicle 1 is increased to enable an improvement in the visibility. On the other hand, when the outside becomes dark in the evening, under cloudy sky, or in a rainy weather, and in a case where the luminance of each display area is kept without change, the luminance of the display area becomes relatively high, and the visual attraction to the display area occurs more easily than to the outside. Furthermore, as the display area is located higher in the vehicle vertical direction, and as the outside becomes darker, the visual attraction to the display area occurs more easily.

Therefore, in the present embodiment, the ECU 134 acquires information of the outside brightness that has been detected by the brightness sensor 124, and controls the display luminance, the display color, and the like of each display area, based on the outside brightness. For example, as the outside becomes darker, the luminance of the display area located on an upper side is suppressed. When the outside becomes darker than a certain level or more, the luminance of the display area located on a lower side is suppressed. Note that the suppression of the luminance is not limited to a reduction in luminance, and can include the luminance being reduced to zero (that is, turning off the backlight in the display area).

For the first display area 311 and the second display area 312, for example, the luminance and the color of the backlight are controlled. For the first display area 311 and the second display area 312, instead of or in addition to the luminance control of the entire display area (backlight), the light emission luminance and the colors of icons, characters, numbers, and the like that are being displayed in the first display area 311 may be controlled. For the third display area 313, the light emission luminance, the light emission color, the light emission position, and the light emission area are controlled. The third display area 313 is disposed at a position far from the visual field of the driver. Therefore, the driver easily recognizes a change in the light emission luminance rather than a change in the light emission color.

<Process>

Next, a procedure of a process performed by the vehicle control device 13 according to the present embodiment will be described with reference to a flowchart of FIG. 4. In the present embodiment, two types of display areas (the first display area 311 and the second display area 312) are controlled.

In S401, the ECU 134 acquires information about the outside brightness as the surrounding information of the vehicle 1 from the brightness sensor 124 of the surroundings monitoring device 12.

In S402, the ECU 134 determines whether the outside brightness is equal to or lower than a threshold. In a case where the outside brightness is higher than the threshold, the process proceeds to S403. On the other hand, in a case where the outside brightness is equal to or lower than the threshold, the process proceeds to S404.

In S403, the ECU 134 controls the luminance of the first display area 311, based on the outside brightness. Specifically, control is conducted such that the luminance of the first display area 311 is suppressed (for example, the luminance is reduced) in accordance with a decrease in the outside brightness, and control is conducted such that the luminance of the first display area 311 is increased in accordance with an increase in the outside brightness. A control target of the luminance is the first display area 311 located on an uppermost side, and neither the luminance of the second display area 312 nor the third display area 313 located below the first display area 311 is changed.

In S404, the ECU 134 controls the luminance of the second display area 312, based on the outside brightness. Specifically, control is conducted such that the luminance of the second display area 312 is suppressed (for example, the luminance is reduced) in accordance with a decrease in the outside brightness, and control is conducted such that the luminance of the second display area 312 is increased in accordance with an increase in the outside brightness. A control target of the luminance is the second display area 312 located on a second uppermost side, and the luminance of the third display area 313 located below the second display area 312 is not changed. Accordingly, the process in FIG. 4 ends.

As described above, in the present embodiment, in the case where the outside brightness is higher than the threshold, the luminance of the first display area located on an upper side is suppressed in accordance with the decrease in the outside brightness. Then, in the case where the outside brightness is equal to or lower than the threshold, the luminance of the second display area located below is suppressed in accordance with the decrease in the outside brightness.

This enables an improvement in the visibility of the outside, in the case where the display area is present in the visual field of the driver. In particular, even when the outside becomes dark, it is possible to prevent the visual attraction of the occupant to the display area and to improve the visibility of the outside.

Figure 4:
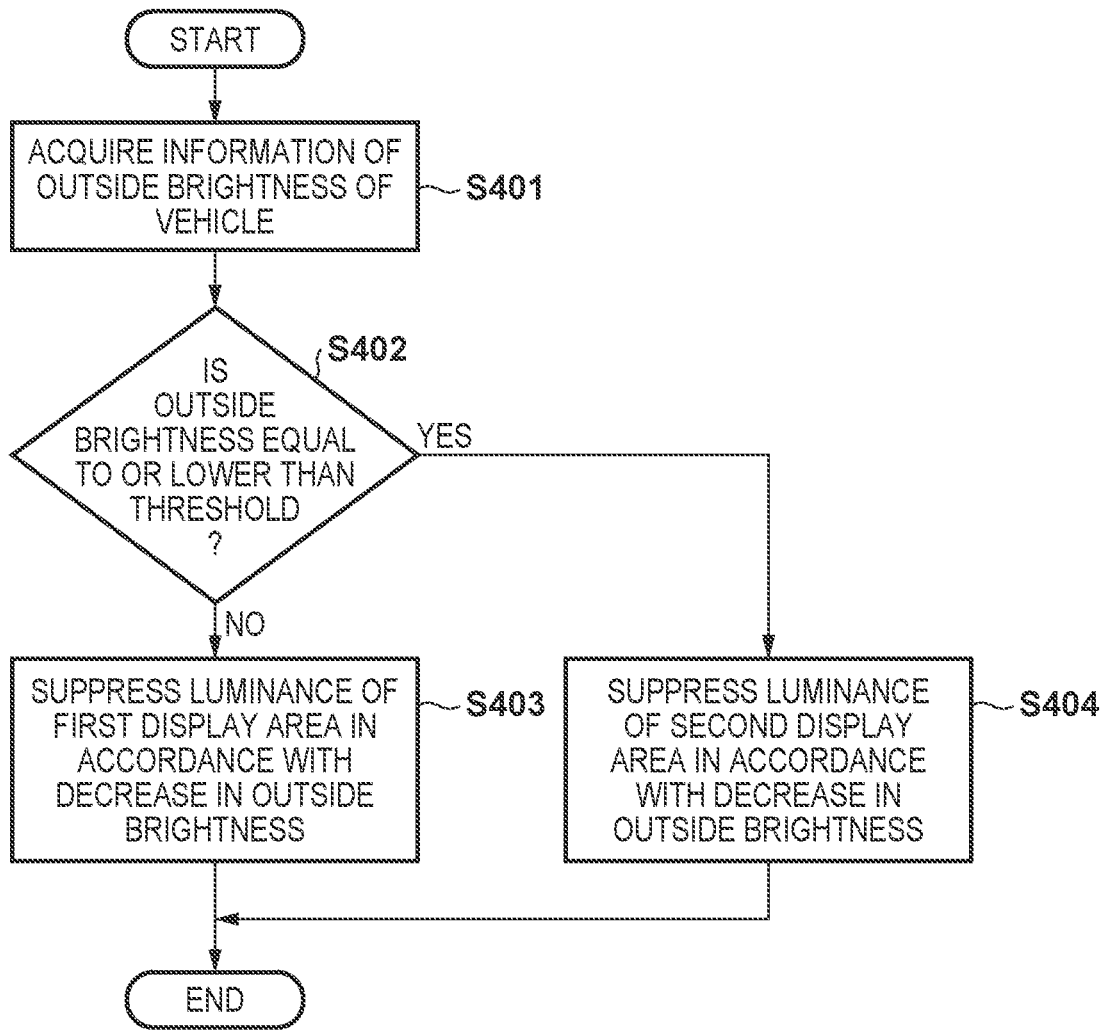
FIG. 4 is a flowchart illustrating a procedure of a process performed by a vehicle control device according to a first embodiment.

Note that in the present embodiment, the description has been given with regard to the example in which, in S404 of FIG. 4, the luminance of the second display area 312 is suppressed in accordance with the decrease in the outside brightness in the case where the outside brightness is equal to or lower than the threshold. However, at that time, the luminance of the first display area 311 may also be suppressed in accordance with the decrease in the outside brightness. That is, for the first display area 311, even in the case where the outside brightness is higher than the threshold or is equal to or lower than the threshold, control may be conducted such that the luminance is suppressed in accordance with the decrease in the outside brightness, whereas for the second display area 312, only in the case where the outside brightness is equal to or lower than the threshold, control may be conducted such that the luminance is suppressed in accordance with the decrease in the outside brightness.

In this manner, while the luminance control in accordance with the outside brightness is always being conducted for the first display area 311 located on an upper side, the luminance control in accordance with the outside brightness is also conducted for the second display area 312 located on a lower side, when the brightness becomes equal to or lower than a certain level. Therefore, it becomes possible to appropriately prevent the visual attraction of the occupant in accordance with the outside brightness and to improve the visibility of the outside.

Further, in the process of FIG. 4, when the outside is brighter than a certain level or more, the control for the display luminance in accordance with the outside brightness may not be conducted for the first display area 311. That is, in a case where the outside brightness is equal to or lower than a first threshold, the luminance control for the first display area 311 in accordance with the outside brightness may be conducted, whereas in a case where the outside brightness is higher than the first threshold, the luminance control for the first display area 311 in accordance with the outside brightness may not be conducted. In such a case, in the case where the outside brightness falls within a range that is equal to or smaller than the first threshold and larger than a second threshold, the luminance control for the first display area 311 may be conducted, whereas in a case where the outside brightness is equal to or lower than the second threshold, the luminance control for the second display area 312 may be conducted.

Second Embodiment

In the present embodiment, a description will be given with regard to an example of further conducting luminance control for the third display area 313, in addition to the luminance control for the first display area 311 and the second display area 312 that has been described in the first embodiment. The device configuration is similar to the configuration that has been described in the first embodiment, and its description will be omitted.

<Process>

Figure 5:
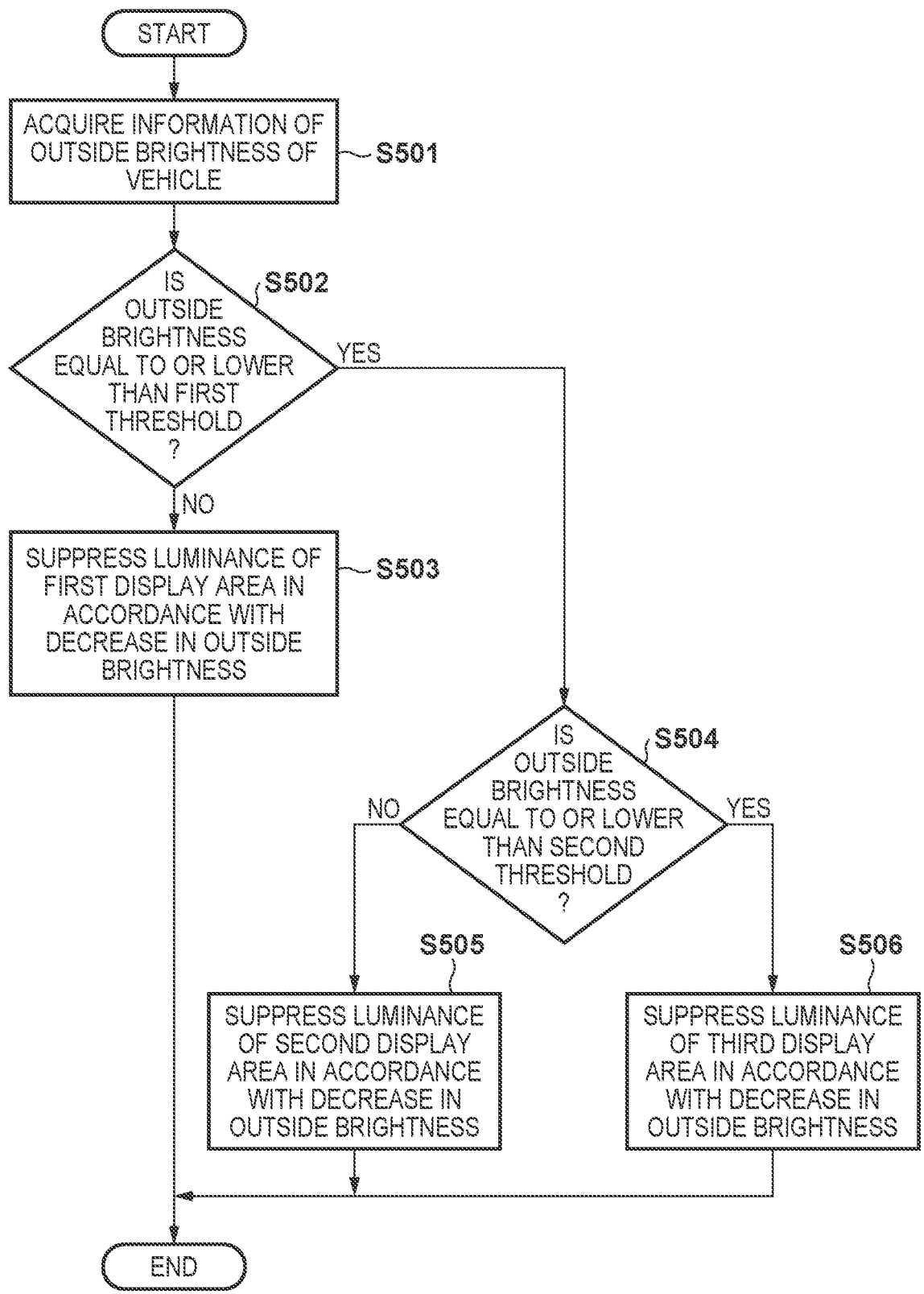
FIG. 5 is a flowchart illustrating a procedure of a process performed by the vehicle control device according to a second embodiment.

A procedure of a process performed by the vehicle control device 13 according to the present embodiment will be described with reference to a flowchart of FIG. 5. In the present embodiment, three types of display areas (the first display area 311, the second display area 312, and the third display area 313) are controlled.

In S501, the ECU 134 acquires information about the outside brightness as the surrounding information of the vehicle 1 from the brightness sensor 124 of the surroundings monitoring device 12.

In S502, the ECU 134 determines whether the outside brightness is equal to or lower than the first threshold. In a case where the outside brightness is higher than the first threshold, the process proceeds to S503. On the other hand, in a case where the outside brightness is equal to or lower than the first threshold, the process proceeds to S504.

In S503, the ECU 134 controls the luminance of the first display area 311, based on the outside brightness. Specifically, control is conducted such that the luminance of the first display area 311 is suppressed (for example, the luminance is reduced) in accordance with a decrease in the outside brightness, and control is conducted such that the luminance of the first display area 311 is increased in accordance with an increase in the outside brightness. A control target of the luminance is the first display area 311 located on an uppermost side, and neither the luminance of the second display area 312 nor the third display area 313 located below the first display area 311 is changed.

In S504, the ECU 134 determines whether the outside brightness is equal to or lower than the second threshold that is smaller than the first threshold. In a case where the outside brightness is higher than the second threshold (a range equal to or smaller than the first threshold and larger than the second threshold), the process proceeds to S505. On the other hand, in a case where the outside brightness is equal to or lower than the second threshold, the process proceeds to S506.

In S505, the ECU 134 controls the luminance of the second display area 312, based on the outside brightness. Specifically, control is conducted such that the luminance of the second display area 312 is suppressed (for example, the luminance is reduced) in accordance with a decrease in the outside brightness, and control is conducted such that the luminance of the second display area 312 is increased in accordance with an increase in the outside brightness. A control target of the luminance is the second display area 312 located on a second uppermost side, and the luminance of the third display area 313 located below the second display area 312 is not changed.

Figure 6:
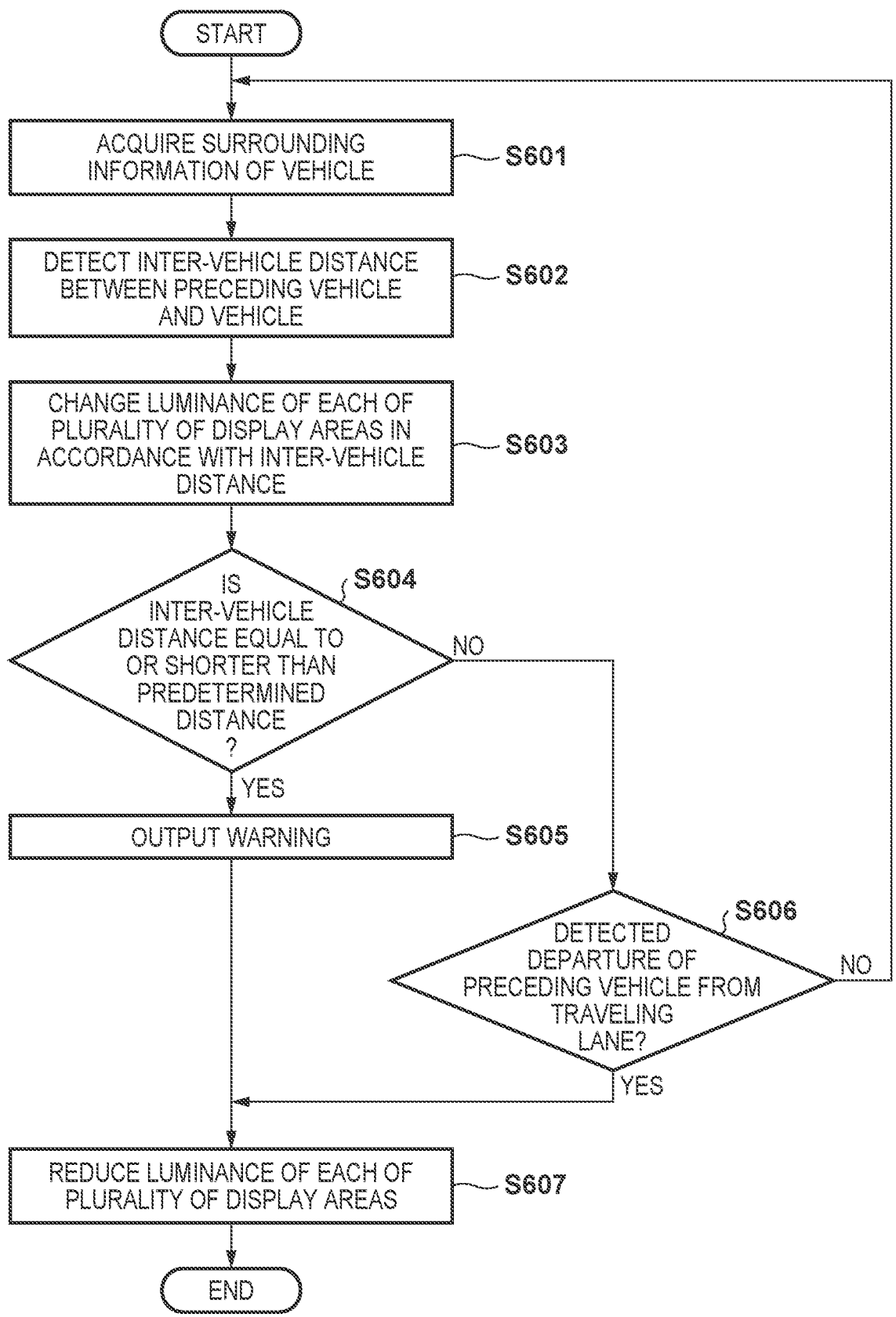
FIG. 6 is a flowchart illustrating a procedure of a process performed by the vehicle control device according to a third embodiment.

In S506, the ECU 134 controls the luminance of the third display area 313, based on the outside brightness. Specifically, control is conducted such that the luminance of the third display area 313 is suppressed (for example, the luminance is reduced) in accordance with the decrease in the outside brightness, and control is conducted such that the luminance of the third display area 313 is increased in accordance with the increase in the outside brightness. In the example of FIG. 3, the luminance of the entirety of the third display areas 313a to 313c may be controlled, or a part of the luminance (for example, only the luminance of the third display area 313c near the driver's seat) may be controlled. Accordingly, the series of processes in FIG. 6 ends.

As described above, in the present embodiment, in the case where the outside brightness is higher than the first threshold, the luminance of the first display area located on an upper side is suppressed in accordance with the decrease in the outside brightness. Then, in the case where the outside brightness is equal to or lower than the first threshold and is higher than the second threshold, the luminance of the second display area located on a lower side is suppressed in accordance with the decrease in the outside brightness. Furthermore, in the case where the outside brightness is equal to or lower than the second threshold, the luminance of the third display area located on a further lower side is suppressed in accordance with the decrease in the outside brightness.

This enables a reduction in the display luminance in order from an upper display area near the driver's visual field, as the outside becomes darker, and enables prevention of the visual attraction of the occupant to the display area and an improvement in the visibility of the outside.

Note that in the present embodiment, the description has been given with regard to the example in which the luminance is adjusted in order from the display area on an upper side in accordance with the outside brightness. However, the luminance of the display area may be further adjusted in accordance with a situation in the vehicle cabin of the vehicle 1.

The ECU 134 detects a situation in the vehicle cabin, based on the captured image that has been acquired by the in-vehicle camera 171 installed inside the vehicle. Then, in a state where the luminance of the third display area 313 is not suppressed, the ECU 134 may increase an upper limit value of the luminance of the third display area 313, in a case where another occupant is present in the front passenger seat of the vehicle 1, in a case where the roof of the vehicle 1 is in an open state, or in a case where an illumination device that is disposed on the ceiling of the vehicle cabin and that illuminates below is turned on.

In the case where another occupant is present in the front passenger seat of the vehicle 1, the third display area 313a on the passenger seat side is hidden when viewed from the driver's seat, and it is difficult to recognize its luminance change. For this reason, in such a case, the upper limit value of the luminance of the third display area 313 is increased, so the luminance change can be easily recognized. Similarly, in the case where the roof of the vehicle 1 is in the open state, light from the outside enters the vehicle cabin, so the inside of the vehicle becomes bright, and it becomes difficult to recognize a luminance change. For this reason, in such a case, the upper limit value of the luminance of the third display area 313 is increased, so the luminance change can be easily recognized. In such a situation, the degree of increase in the upper limit value may be changed in accordance with the opening degree of the roof. For example, the upper limit value may be higher, as the opening degree of the roof is larger. Similarly, in the case where the illumination device that is disposed on the ceiling of the vehicle cabin and that illuminates below is turned on, the inside of the vehicle becomes bright, and it is difficult to recognize a luminance change. For this reason, in such a case, the upper limit value of the luminance of the third display area 313 is increased, so the luminance change can be easily recognized.

In addition, in a state where the luminance of the third display area 313 is not suppressed, that is, in a state where the outside brightness is higher than the second threshold, the upper limit value of the luminance of the third display area 313 is increased in the above case, it becomes possible to recognize the display (light emission) of the third display area 313 in a more easily manner.

Third Embodiment

In the first embodiment and the second embodiment, as the outside becomes darker, the luminance is suppressed in order from the luminance of the display area on an upper side near the driver's visual field. On the other hand, in the present embodiment, a description will be given with regard to an example in which the luminance of the display area is controlled in accordance with an inter-vehicle distance between the vehicle 1 and a preceding vehicle traveling ahead of the vehicle 1.

In S601, the ECU 134 acquires the surrounding information from the surroundings monitoring device 12.

In S602, in a case where a preceding vehicle traveling ahead in the traveling lane of the vehicle 1 is detected, based on the surrounding information acquired in S601, the ECU 134 detects the inter-vehicle distance between the preceding vehicle and the vehicle 1. Specifically, the inter-vehicle distance between the preceding vehicle and the vehicle 1 is calculated and acquired, based on the surrounding information.

In S603, the ECU 134 changes the luminance of each of the plurality of display areas in accordance with the inter-vehicle distance between the preceding vehicle and the vehicle 1 detected in S602. Specifically, control is conducted such that as the inter-vehicle distance becomes longer, the luminance is lower, whereas the inter-vehicle distance becomes shorter, the luminance is higher. This enables the driver to easily recognize that the vehicle 1 is approaching the preceding vehicle. Here, the target of the luminance control may be, for example, all of the first display area 311, the second display area 312, and the third display area 313, two types of display areas that are the first display area 311 and the second display area 312 and that are located on an upper side, or only the first display area 311 that is located on the uppermost side.

In S604, the ECU 134 determines whether the inter-vehicle distance between the preceding vehicle and the vehicle 1 is equal to or shorter than a predetermined distance. In a case where the inter-vehicle distance is equal to or shorter than the predetermined distance, the process proceeds to S605. On the other hand, in a case where the inter-vehicle distance is longer than the predetermined distance, the process proceeds to S607.

In S605, the ECU 134 outputs a warning to notify the driver that the distance to the preceding vehicle is short. The warning can be output by using, for example, sound and/or vibration of the steering operator 113 (steering wheel).

In S606, the ECU 134 determines whether departure of the preceding vehicle from the traveling lane of the vehicle 1 is detected. The departure from the traveling lane means that the preceding vehicle turns to the right or left or changes lanes, and disappears from the view ahead of the vehicle 1. In a case where the departure of the preceding vehicle is detected, the process proceeds to S607. On the other hand, in a case where the departure of the preceding vehicle is not detected, the process returns to S601.

In step S607, the ECU 134 reduces the luminance of each of the plurality of display areas. When the warning is output, the driver is able to recognize that the driver has to be careful. Therefore, it is not necessary to increase the luminance of the display area to call attention, and control is conducted to reduce the luminance of the display area. In such a situation, the ECU 134 may reduce the luminance of each of the plurality of display areas with a larger change in the luminance than the change in the luminance in a case where the luminance of each of the plurality of display areas is increased. This makes it possible to easily recognize that the luminance is reduced in response to the warning that has been output.

Figure 7A:
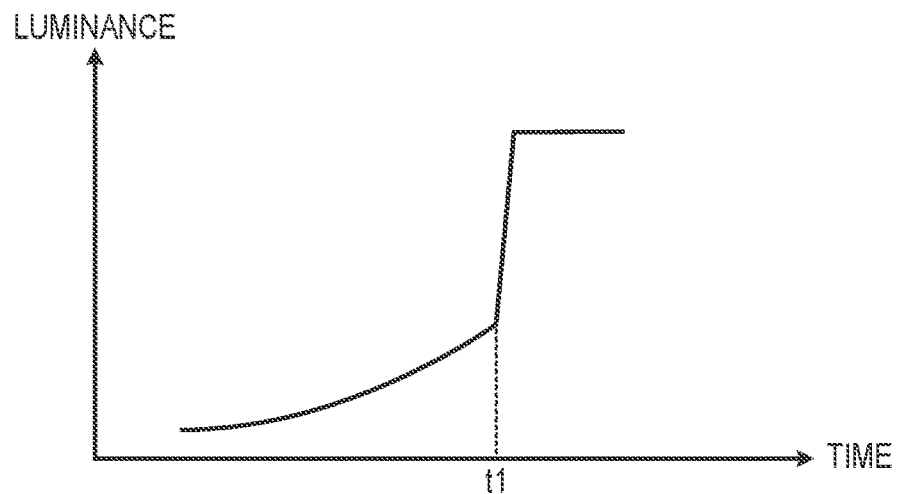
FIGS. 7A to 7C are each a diagram illustrating an example of a luminance change in a display area according to an embodiment of the present invention.
Figure 7B:
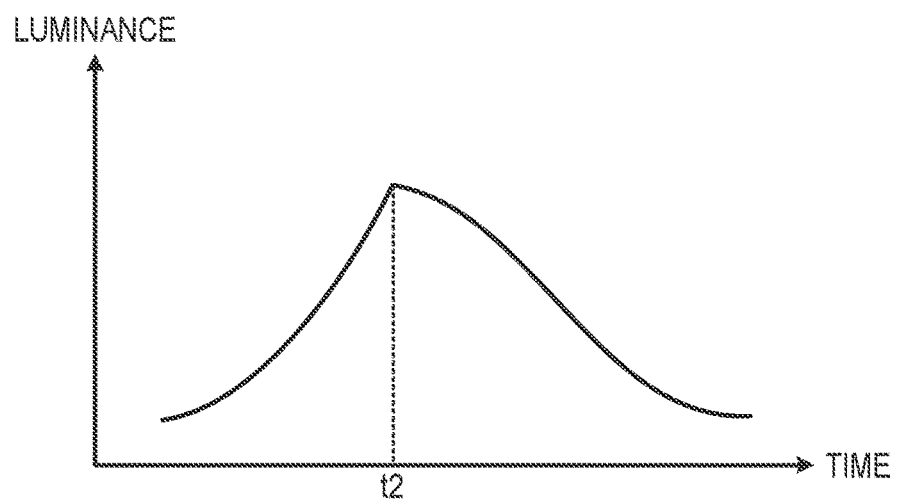

Further, the ECU 134 also reduces the luminance of the display area, also in a case where the preceding vehicle has departed from the traveling lane (turning to the right or left, a lane change, or the like). This is because no preceding vehicle is present, and eliminates the need for calling attention. This makes it possible to easily recognize that the preceding vehicle has departed from the traveling lane. In this situation, control may be conducted such that a luminance change in a case where the luminance of each of the plurality of display areas is reduced in accordance with the departure of the preceding vehicle is gentler than a luminance change in a case where the luminance of each of the plurality of display areas is increased in accordance with the inter-vehicle distance. Here, FIG. 7B is a diagram illustrating an example of the luminance change at the time of departure. As illustrated in FIG. 7B, for example, on a scene in which the luminance of the display area is gradually increasing due to the approach to the preceding vehicle, the departure of the preceding vehicle occurs at t2. After that, the luminance of the display area is reduced with a luminance change gentler than before t2.

A sudden change in the luminance causes a visual attraction. Therefore, the luminance is gently changed while the luminance is being reduced with no warning intention, so that an unnecessary visual attraction can be avoided. In particular, there is a possibility that the departure of the preceding vehicle from the traveling lane is an event that is not predicted by the occupant of the vehicle 1. Therefore, it is possible to avoid an unnecessary visual attraction by gently reducing the luminance.

As described above, in the present embodiment, the luminance of the display area is controlled in accordance with the inter-vehicle distance between the preceding vehicle and the vehicle 1. This makes it possible to call attention to the driver in accordance with the inter-vehicle distance. Then, in a case where the inter-vehicle distance between the preceding vehicle and the vehicle 1 becomes equal to or shorter than a predetermined distance and a warning is output, the luminance of the display area is reduced. When the warning is output, the driver is able to recognize that the driver has to be careful. Therefore, it is not necessary to increase the luminance of the display area to call attention. In addition, the luminance of the display area is reduced, also in a case where the preceding vehicle has departed from the traveling lane (turning to the right or left, a lane change, or the like). This is because no preceding vehicle is present, and eliminates the need for calling attention.

Figure 7C:
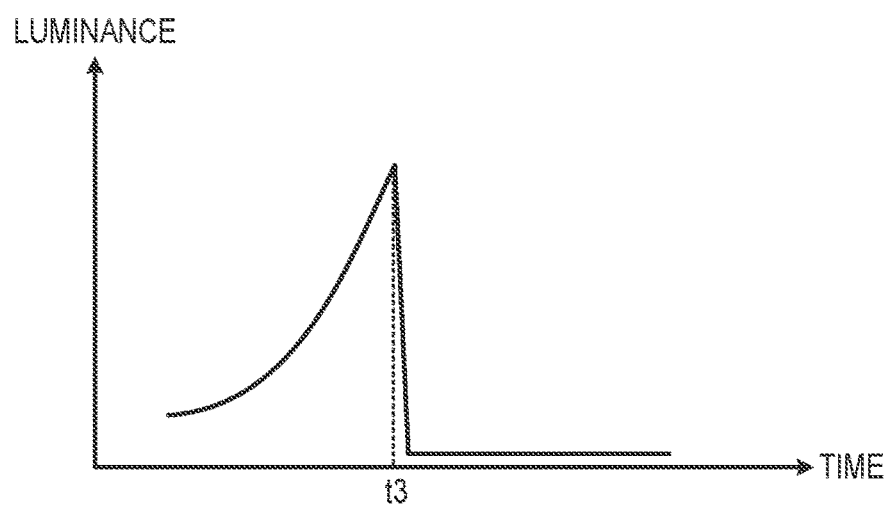

Note that in the present embodiment, the description has been given with regard to an example in which, in S604, the warning is output and the luminance of the display area is reduced, in the case where the inter-vehicle distance becomes equal to or shorter than the predetermined distance. Instead of or in addition to this, in the case where the inter-vehicle distance is longer than the predetermined distance due to the braking operation that has been performed by the occupant (the occupant steps on the brake pedal), the call attention is no longer necessary, and control is conducted to reduce the luminance of the display area. In such a situation, the luminance of each of the plurality of display areas may be reduced with a luminance change larger than a luminance change in a case where the luminance of each of the plurality of display areas is increased. FIG. 7C is a diagram illustrating an example of a luminance change in a case where the braking operation is performed by the occupant. In FIG. 7C, the luminance increases as the vehicle approaches the preceding vehicle, the braking operation is performed by the occupant at t3, and then the luminance is rapidly reduced. In the illustrated example, the luminance is not zero, but may be reduced to zero. This makes it possible to easily recognize that the luminance is reduced in response to the braking operation that has been performed.

Modifications

Note that in the present embodiment, the upper limit value of the luminance range of the display area may be changed, based on the outside brightness. In a case where the outside brightness is 90 (without units, because this is an example as a relative value) or more, for example, in a case where the outside brightness is 100 on a sunny day, the basic display luminance of the display area is set to 50, and the upper limit value is set to 80. Then, in a case where the outside brightness is lower than 90, for example, in a case where the outside brightness is 80 on a cloudy day, the basic display luminance of the display area is set to 50, and the upper limit value is set to 70.

On a sunny day, the luminance of the display area is changed in a luminance range from 50 to 80 in accordance with the inter-vehicle distance between the preceding vehicle and the vehicle 1. On the other hand, on a cloudy day, the luminance of the display area is changed in a luminance range from 50 to 70 in accordance with the inter-vehicle distance between the preceding vehicle and the vehicle 1. Alternatively, the luminance of the display area may be changed in a luminance range from 40 to 70 to achieve a luminance change range (30) similar to that of the sunny day.

That is, in a case where the outside brightness is a predetermined brightness or more, the upper limit value of the luminance range at the time of changing the luminance of the plurality of display areas in accordance with the inter-vehicle distance may be set to a first luminance value (80 in the above example), and in a case where the outside brightness is lower than the predetermined brightness, the upper limit value may be set to a second luminance value (70 in the above example) smaller than the first luminance value.

In this manner, in the case where the outside is bright, the upper limit value of the luminance range of the display area is set to a large value, and in the case where the outside is dark, the upper limit value of the luminance range of the display area is set to a small value. This makes it possible to display with an appropriate display luminance in accordance the brightness of the outside, and enables prevention of an unnecessary visual attraction.

Note that the upper limit value of the luminance of each display area may be the same or different. For example, as the distance increases from the visual field of the driver, the upper limit value of the luminance may be increased, and a change degree of light may be increased. That is, the upper limit value of the luminance of the second display area 312 may be larger than that of the first display area 311. In addition, the upper limit value of the luminance of the third display area 313 may be larger than that of the second display area 312.

In addition, for example, a display (for example, a touch panel display) capable of displaying a navigation screen or the like and/or one or more physical switches may be used as an operation unit, and an operation of changing the luminance of a plurality of areas may be acceptable with use of the operation unit. Then, when the operation unit is operated by the occupant of the vehicle 1, while the luminance of the plurality of display areas are being changed in accordance with the inter-vehicle distance according to the third embodiment, control may be conducted to increase the luminance of the plurality of display areas. In such a situation, for example, the luminance may be increased to the upper limit value of the display luminance. For example, as illustrated in FIG. 7A, on a scene in which the inter-vehicle distance becomes shorter and the luminance is gradually changing to be higher, when the operation unit is operated at t1 and the luminance change operation is performed (or when the display screen for luminance change is displayed on the display), control is conducted to increase the luminance of the display area in a short time.

Even when the occupant sees the luminance changes in the plurality of display areas in accordance with the inter-vehicle distance, there is a possibility that the occupant does not understand that such a change is a warning based on a decrease in the inter-vehicle distance, misunderstands that the change is a malfunction of the display area, and tries to adjust the luminance of the display area by oneself with use of the operation unit. Therefore, the luminance of the display area is increased in response to the luminance adjustment that has been operated by the operation of the operation unit, so that it becomes possible to make the occupant clearly recognize the luminance change and immediately recognize the warning based on the approach to the preceding vehicle. Therefore, it becomes possible to make the occupant stop the luminance adjustment operation of the display area with use of the operation unit at an early stage and visually recognize the outside.

In addition, in the present embodiment, the description has been given with regard to the example in which the luminance of each display area is changed in accordance with the inter-vehicle distance between the vehicle 1 and the preceding vehicle traveling ahead of the vehicle 1. However, the target to be changed is not limited to the luminance. For example, control may be conducted to change the color of each of the plurality of display areas, based on the inter-vehicle distance. For example, the color may be blue (or green) when the inter-vehicle distance is long, the color may be changed to yellow, when the inter-vehicle distance becomes equal to or shorter than a first threshold, and the color may be changed to red, when the inter-vehicle distance becomes further shorter and becomes equal to or shorter than a second threshold. The driver looks at the color change of the display area, and is able to intuitively recognize that attention and caution are necessary.

In addition, both the luminance and the color of the display area may be changed in accordance with the inter-vehicle distance. For example, when the inter-vehicle distance becomes shorter, control is conducted to change the color to red and increase the luminance, so that it becomes possible to easily recognize that attention and caution are necessary due to an approach to the preceding vehicle.

Figure 8A:
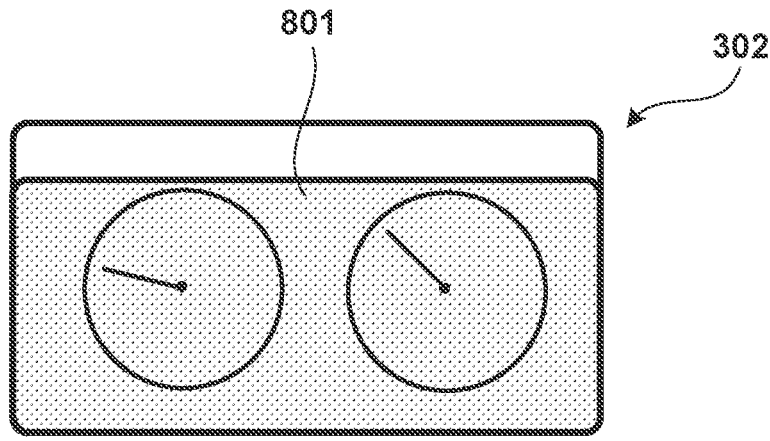
FIGS. 8A to 8C are each a diagram illustrating an example of an area range in which the luminance change in a second display area is conducted according to an embodiment of the present invention.
Figure 8B:
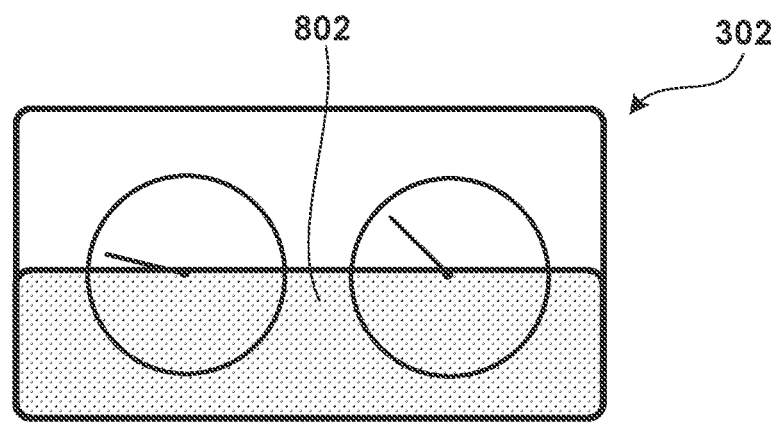
Figure 8C:
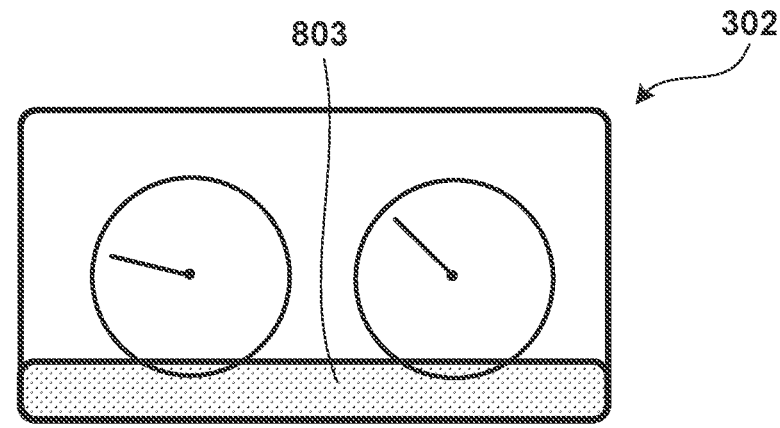

In each of the above-described embodiments, the description has been given with regard to the example in which the luminance of the display area is changed in accordance with the outside brightness. However, for example, regarding the second display area 312 of the second display unit 302, for example, instead of changing the luminance of the entire area of the second display area 312 (entire backlight), the area where the luminance is changed may be changed in accordance with the outside brightness. For example, FIG. 8A illustrates an example of a luminance change area in a case where the outside is bright. Control is conducted such that the luminance of a change area 801 in the second display area 312 of the second display unit 302 is changed. FIG. 8B illustrates an example of the luminance change area in a case where the outside brightness is medium. As illustrated in the drawing, control is conducted to change the luminance of a change area 802 (approximately a lower-half area) in the second display area 312 of the second display unit 302. FIG. 8C illustrates an example of the luminance change area in a case where the outside is dark. As illustrated in the drawing, control is conducted to change the luminance of a change area 803 in the second display area 312 of the second display unit 302. Although three patterns have been illustrated in the illustrated example, the luminance change area may be changed continuously in accordance with the outside brightness. That is, control may be conducted such that the luminance change area is increased upward, as the outside becomes brighter, whereas the luminance change area is reduced downward, as the outside becomes darker. Accordingly, in a case where the outside is dark, the luminance on an upper side in the visual field is reduced, and thus the visual attraction can be prevented.

Further, in the third embodiment, in conducting the control for changing the luminance in accordance with the inter-vehicle distance between the preceding vehicle and the vehicle 1, in the case where the inter-vehicle distance is a predetermined distance or more, the backlight of the second display area 312 may be turned off or slightly turned on, and in the case where the inter-vehicle distance becomes short, control may be conducted to change the color of the backlight to white or red. However, in a case where the outside is dark, control may be conducted such that the luminance in changing to white or red is lower than that in the case where the outside is bright.

Furthermore, the ECU 135 may analyze an image that has been captured by the in-vehicle camera 171 of the occupant monitoring device 17 to estimate an occurrence of the visual attraction, based on visual line direction or the face direction of the occupant (in particular, the driver). In a case where it is estimated that visual attraction has occurred due to the luminance change in the display area, the ECU 134 may automatically adjust the degree of the luminance change (for example, adjust the degree of the luminance change to be gentler than the current luminance change).

In addition, either the first embodiment or the second embodiment may be combined and conducted with the third embodiment. That is, the luminance control of the display area in accordance with the inter-vehicle distance in the third embodiment may be conducted together with the control for suppressing the luminance in order of the display area located on an upper side, as the outside becomes darker in either the first embodiment or the second embodiment.

OTHER EMBODIMENTS

In addition, a program for achieving one or more functions that have been described in each of the embodiments is supplied to a system or apparatus through a network or a storage medium, and one or more processors in a computer of such a system or apparatus are capable of reading and executing the program. The present invention is also achievable by such an aspect.

The invention is not limited to the foregoing embodiments, and various variations/changes are possible within the spirit of the invention.

SUMMARY OF EMBODIMENTS

A vehicle control device (for example, 13) according to a first aspect is a vehicle control device that controls a vehicle (for example, 1), the vehicle control device including:

a luminance acquisition unit (for example, 12, 134) configured to acquire information of outside brightness of the vehicle; and a control unit (for example, 134) configured to control, based on the outside brightness, luminance of a plurality of display areas including a first display area (for example, 311) displayed by a first display unit (for example, 301) for displaying a situation of the vehicle and a second display area (for example, 312) displayed by a second display unit (for example, 302) for displaying a situation of the vehicle, the second display area being displayed below the first display area, in which in a case where the outside brightness is higher than a first threshold, the control unit suppresses luminance of the first display area in accordance with a decrease in the outside brightness, and in a case where the outside brightness is equal to or lower than the first threshold, the control unit suppresses luminance of the second display area in accordance with the decrease in the outside brightness.

This enables an improvement in the visibility of the outside, in the case where the display area is present in the visual field of the driver. In particular, even when the outside becomes dark, it is possible to prevent the visual attraction of the occupant to the display area and to improve the visibility of the outside.

In the vehicle control device (for example, 13) according to a second aspect, in the case where the outside brightness is equal to or lower than the first threshold, the control unit suppresses the luminance of the first display area and suppresses the luminance of the second display area in accordance with the decrease in the outside brightness.

Accordingly, when the outside is bright, the visual attraction can be prevented by controlling the display area located on an upper side in accordance with the outside brightness, and when the outside is dark, the visual attraction can be more effectively prevented by controlling both display areas in accordance with the outside brightness.

In the vehicle control device (for example, 13) according to a third aspect, the plurality of display areas further include a third display area displayed by a third display unit, the third display area being disposed below the second display area and in a periphery in an inside of the vehicle, and the control unit further controls luminance of the third display area, based on the outside brightness, and in the case where the outside brightness is equal to or lower than a second threshold that is smaller than the first threshold, the control unit suppresses the luminance of the third display area in accordance with the decrease in the outside brightness.

Accordingly, when the outside becomes darker, it is possible to more effectively prevent the visual attraction by controlling the luminance of the display area located on a further lower side.

The vehicle control device (for example, 13) according to a fourth aspect further includes a surrounding information acquisition unit (for example, 12, 134) configured to acquire surrounding information of the vehicle, in which the control unit detects an inter-vehicle distance between the vehicle and a preceding vehicle traveling ahead of the vehicle, based on the surrounding information, and the control unit changes luminance of each of the plurality of display areas in accordance with the inter-vehicle distance.

This makes it possible to intuitively recognize the inter-vehicle distance between the preceding vehicle and the vehicle by the luminance adjustment.

In the vehicle control device (for example, 13) according to a fifth aspect, the control unit reduces the luminance of each of the plurality of display areas, as the inter-vehicle distance becomes longer, and increases the luminance of each of the plurality of display areas, as the inter-vehicle distance becomes shorter.

Accordingly, the luminance of the display area is increased, so that it becomes possible to easily recognize the approach to the preceding vehicle.

In the vehicle control device (for example, 13) according to a sixth aspect, in a case where the outside brightness is equal to or higher than predetermined brightness, the control unit sets, as a first luminance value, an upper limit value of a luminance range in changing the luminance of the plurality of display areas in accordance with the inter-vehicle distance, and in a case where the outside brightness is lower than the predetermined brightness, the control unit sets the upper limit value as a second luminance value that is smaller than the first luminance value.

This makes it possible to display with an appropriate display luminance in accordance the brightness of the outside, and enables prevention of an unnecessary visual attraction.

The vehicle control device (for example, 13) according to a seventh aspect further includes an operation unit (for example, a touch panel display, a physical button, or the like) configured to receive an operation of changing the luminance of the plurality of display areas, in which, while the control unit is changing the luminance of the plurality of display areas in accordance with the inter-vehicle distance, when the operation unit is operated by an occupant of the vehicle, the control unit increases the luminance of the plurality of display areas.

Therefore, the luminance of the display area is increased in response to the luminance adjustment operation by operating the operation unit, so that it becomes possible to make the occupant clearly recognize the luminance change and immediately recognize that the current luminance change in the display area is a warning based on the approach to the preceding vehicle. Therefore, it becomes possible to make the occupant stop the luminance adjustment operation of the display area with use of the operation unit at an early stage and visually recognize the outside.

In the vehicle control device (for example, 13) according to an eighth aspect, while the control unit is changing the luminance of the plurality of display areas in accordance with the inter-vehicle distance, when the operation unit is operated by the occupant of the vehicle, the control unit increases the luminance of the plurality of display areas to an upper limit value.

Accordingly, it is possible to make the occupant more clearly recognize the luminance change and more quickly recognize that the current luminance change in the display area is a warning based on the approach to the preceding vehicle.

The vehicle control device (for example, 13) according to a ninth aspect further includes a surrounding information acquisition unit (for example, 12, 134) configured to acquire surrounding information of the vehicle, in which the control unit detects an inter-vehicle distance between the vehicle and a preceding vehicle traveling ahead of the vehicle, based on the surrounding information, and the control unit changes a color of each of the plurality of display areas in accordance with the inter-vehicle distance.

This makes it possible to make the occupant intuitively recognize the inter-vehicle distance between the preceding vehicle and the vehicle with the color adjustment.

In the vehicle control device (for example, 13) according to a tenth aspect, the control unit detects departure of the preceding vehicle traveling ahead of the vehicle from a traveling lane (for example, turning to the right or left, a lane change, or the like), based on the surrounding information, and the control unit reduces the luminance of each of the plurality of display areas in accordance with the departure of the preceding vehicle.

This makes it possible to easily recognize that the preceding vehicle has departed from the traveling lane.

In the vehicle control device (for example, 13) according to an eleventh aspect, the control unit conducts control such that a luminance change in a case of reducing the luminance of each of the plurality of display areas in accordance with the departure of the preceding vehicle is gentler than a luminance change in a case of increasing the luminance of each of the plurality of display areas in accordance with the inter-vehicle distance.

A sudden change in the luminance causes a visual attraction. Therefore, the luminance is gently changed while the luminance is being reduced with no warning intention, so that an unnecessary visual attraction can be avoided.

The vehicle control device (for example, 13) according to a twelfth aspect further includes a detection unit (for example, 17, 134) configured to detect a situation of a vehicle cabin of the vehicle, in which in a state where the luminance of the third display area is not suppressed, in a case where another occupant is present in a front passenger seat of the vehicle, in a case where a roof of the vehicle is in an open state, or in a case where an illumination device that is disposed on a ceiling of the vehicle cabin and that illuminates below is turned on, the control unit increases an upper limit value of the luminance of the third display area.

Accordingly, even in a case where the display is blocked by another occupant or in a case where the inside of the vehicle becomes bright, the luminance change can be easily recognized.

The vehicle control device (for example, 13) according to a thirteenth aspect further includes a warning unit (for example, 18, 134) configured to output a warning, in a case where the inter-vehicle distance becomes equal to or shorter than a predetermined distance, in which, when the warning is output, the control unit reduces the luminance of each of the plurality of display areas with a luminance change larger than a luminance change in a case of increasing the luminance of each of the plurality of display areas.

This makes it possible to easily recognize that the luminance is reduced in response to the warning that has been output.

In the vehicle control device (for example, 13) according to a fourteenth aspect, in a case where the inter-vehicle distance is longer than a predetermined distance due to a braking operation that has been operated by an occupant of the vehicle, the control unit reduces the luminance of each of the plurality of display areas with a luminance change larger than a luminance change in a case of increasing the luminance of each of the plurality of display areas.

This makes it possible to easily recognize that the luminance is reduced in response to the braking operation that has been performed.

In the vehicle control device (for example, 13) according to a fifteenth aspect, the control unit controls backlight luminance of the first display area and backlight luminance of the second display area.

Thus, the visual attraction can effectively be prevented by adjusting the luminance of the backlight having a wide range.

In the vehicle control device (for example, 13) according to a sixteenth aspect, the first display unit is a head-up display, and the second display unit is a meter display unit.

Accordingly, the display area of the head-up display or the meter display unit included in the visual field of the driver can be controlled, based on the outside brightness.

In the vehicle control device (for example, 13) according to a seventeenth aspect, the third display unit is an indoor light disposed in the periphery in the inside of the vehicle, extending in a horizontal direction, and disposed below a windshield.

Accordingly, the display area (light emission area) of the indoor light can be controlled, based on the outside brightness.

A vehicle (for example, 1) according to an eighteenth aspect is a vehicle including the vehicle control device of one of the first to seventeenth aspects.

Accordingly, the process of the vehicle control device is achievable on the vehicle.

An operation method for a vehicle control device (for example, 13) according to a nineteenth aspect is an operation method for a vehicle control device for controlling a vehicle, the operation method including:

acquiring information of outside brightness of the vehicle; and controlling, based on the outside brightness, luminance of a plurality of display areas including a first display area displayed by a first display unit for displaying a situation of the vehicle and a second display area displayed by a second display unit for displaying a situation of the vehicle, the second display area being displayed below the first display area, in which in a case where the outside brightness is higher than a threshold, the controlling suppresses luminance of the first display area in accordance with a decrease in the outside brightness, and in a case where the outside brightness is equal to or lower than the threshold, the controlling suppresses luminance of the second display area in accordance with the decrease in the outside brightness.

This enables an improvement in the visibility of the outside, in the case where the display area is present in the visual field of the driver. In particular, even when the outside becomes dark, it is possible to prevent the visual attraction of the occupant to the display area and to improve the visibility of the outside.

A storage medium according to a twentieth aspect is a non-transitory computer-readable storage medium that stores a program for causing a computer to function as the vehicle control device of one of the first to seventeenth aspects.

Accordingly, the process by the vehicle control device is achievable by the computer.

According to the present invention, in a case where the display area is present in the visual field of the driver, an improvement in the visibility of the outside is enabled.

What is claimed is:

1. A vehicle control device that controls a vehicle, the vehicle control device comprising:
   a luminance acquisition unit configured to acquire information of outside brightness of the vehicle; and
   a control unit configured to control, based on the outside brightness, luminance of a plurality of display areas including a first display area displayed by a first display unit for displaying a situation of the vehicle and a second display area displayed by a second display unit for displaying a situation of the vehicle, the second display area being displayed below the first display area, wherein
   in a case where the outside brightness is higher than a first threshold, the control unit suppresses luminance of the first display area in accordance with a decrease in the outside brightness, and
   in a case where the outside brightness is equal to or lower than the first threshold, the control unit suppresses luminance of the second display area in accordance with the decrease in the outside brightness, wherein
   the plurality of display areas further include a third display area displayed by a third display unit, the third display area being disposed below the second display area and in a periphery in an inside of the vehicle, and
   the control unit further controls luminance of the third display area, based on the outside brightness, and
   in the case where the outside brightness is equal to or lower than a second threshold that is smaller than the first threshold, the control unit suppresses the luminance of the third display area in accordance with the decrease in the outside brightness.

2. The vehicle control device according to claim 1, wherein in the case where the outside brightness is equal to or lower than the first threshold, the control unit suppresses the luminance of the first display area and suppresses the luminance of the second display area in accordance with the decrease in the outside brightness.

3. The vehicle control device according to claim 1, further comprising
a surrounding information acquisition unit configured to acquire surrounding information of the vehicle, wherein
the control unit detects an inter-vehicle distance between the vehicle and a preceding vehicle traveling ahead of the vehicle, based on the surrounding information, and
the control unit changes luminance of each of the plurality of display areas in accordance with the inter-vehicle distance.

4. The vehicle control device according to claim 3, wherein the control unit reduces the luminance of each of the plurality of display areas, as the inter-vehicle distance becomes longer, and increases the luminance of each of the plurality of display areas, as the inter-vehicle distance becomes shorter.

5. The vehicle control device according to claim 3, further comprising
an operation unit configured to receive an operation of changing the luminance of the plurality of display areas, wherein,
while the control unit is changing the luminance of the plurality of display areas in accordance with the inter-vehicle distance, when the operation unit is operated by an occupant of the vehicle, the control unit increases the luminance of the plurality of display areas.

6. The vehicle control device according to claim 5, wherein, while the control unit is changing the luminance of the plurality of display areas in accordance with the inter-vehicle distance, when the operation unit is operated by the occupant of the vehicle, the control unit increases the luminance of the plurality of display areas to an upper limit value.

7. The vehicle control device according to claim 3, wherein
the control unit detects departure of the preceding vehicle traveling ahead of the vehicle from a traveling lane, based on the surrounding information, and
the control unit reduces the luminance of each of the plurality of display areas in accordance with the departure of the preceding vehicle.

8. The vehicle control device according to claim 1, further comprising
a surrounding information acquisition unit configured to acquire surrounding information of the vehicle, wherein
the control unit detects an inter-vehicle distance between the vehicle and a preceding vehicle traveling ahead of the vehicle, based on the surrounding information, and
the control unit changes a color of each of the plurality of display areas in accordance with the inter-vehicle distance.

9. The vehicle control device according to claim 1, further comprising
a detection unit configured to detect a situation of a vehicle cabin of the vehicle, wherein
in a state where the luminance of the third display area is not suppressed,
in a case where another occupant is present in a front passenger seat of the vehicle, in a case where a roof of the vehicle is in an open state, or in a case where an illumination device that is disposed on a ceiling of the vehicle cabin and that illuminates below is turned on, the control unit increases an upper limit value of the luminance of the third display area.

10. The vehicle control device according to claim 1, wherein the control unit controls backlight luminance of the first display area and backlight luminance of the second display area.

11. The vehicle control device according to claim 1, wherein the first display unit is a head-up display, and the second display unit is a meter display unit.

12. The vehicle control device according to claim 1, wherein the third display unit is an indoor light disposed in the periphery in the inside of the vehicle, extending in a horizontal direction, and disposed below a windshield.

13. A vehicle comprising the vehicle control device according to claim 1.

14. A vehicle control device that controls a vehicle, the vehicle control device comprising:
a luminance acquisition unit configured to acquire information of outside brightness of the vehicle; and
a control unit configured to control, based on the outside brightness, luminance of a plurality of display areas including a first display area displayed by a first display unit for displaying a situation of the vehicle and a second display area displayed by a second display unit for displaying a situation of the vehicle, the second display area being displayed below the first display area, wherein
in a case where the outside brightness is higher than a first threshold, the control unit suppresses luminance of the first display area in accordance with a decrease in the outside brightness, and
in a case where the outside brightness is equal to or lower than the first threshold, the control unit suppresses luminance of the second display area in accordance with the decrease in the outside brightness,
the vehicle control device further comprising
a surrounding information acquisition unit configured to acquire surrounding information of the vehicle, wherein
the control unit detects an inter-vehicle distance between the vehicle and a preceding vehicle traveling ahead of the vehicle, based on the surrounding information, and
the control unit changes luminance of each of the plurality of display areas in accordance with the inter-vehicle distance,
in a case where the outside brightness is equal to or higher than predetermined brightness, the control unit sets, as a first luminance value, an upper limit value of a luminance range in changing the luminance of the plurality of display areas in accordance with the inter-vehicle distance, and
in a case where the outside brightness is lower than the predetermined brightness, the control unit sets the upper limit value as a second luminance value that is smaller than the first luminance value.

15. A vehicle control device that controls a vehicle, the vehicle control device comprising:
a luminance acquisition unit configured to acquire information of outside brightness of the vehicle; and
a control unit configured to control, based on the outside brightness, luminance of a plurality of display areas including a first display area displayed by a first display unit for displaying a situation of the vehicle and a second display area displayed by a second display unit for displaying a situation of the vehicle, the second display area being displayed below the first display area, wherein in a case where the outside brightness is higher than a first threshold, the control unit suppresses luminance of the first display area in accordance with a decrease in the outside brightness, and in a case where the outside brightness is equal to or lower than the first threshold, the control unit suppresses luminance of the second display area in accordance with the decrease in the outside brightness, the vehicle control device further comprising:

a surrounding information acquisition unit configured to acquire surrounding information of the vehicle, wherein the control unit detects an inter-vehicle distance between the vehicle and a preceding vehicle traveling ahead of the vehicle, based on the surrounding information, and the control unit changes luminance of each of the plurality of display areas in accordance with the inter-vehicle distance, wherein the control unit detects departure of the preceding vehicle traveling ahead of the vehicle from a traveling lane, based on the surrounding information, and the control unit reduces the luminance of each of the plurality of display areas in accordance with the departure of the preceding vehicle, wherein the control unit conducts control such that a luminance change in a case of reducing the luminance of each of the plurality of display areas in accordance with the departure of the preceding vehicle is gentler than a luminance change in a case of increasing the luminance of each of the plurality of display areas in accordance with the inter-vehicle distance.

16. A vehicle control device that controls a vehicle, the vehicle control device comprising:

a luminance acquisition unit configured to acquire information of outside brightness of the vehicle; and a control unit configured to control, based on the outside brightness, luminance of a plurality of display areas including a first display area displayed by a first display unit for displaying a situation of the vehicle and a second display area displayed by a second display unit for displaying a situation of the vehicle, the second display area being displayed below the first display area, wherein in a case where the outside brightness is higher than a first threshold, the control unit suppresses luminance of the first display area in accordance with a decrease in the outside brightness, and in a case where the outside brightness is equal to or lower than the first threshold, the control unit suppresses luminance of the second display area in accordance with the decrease in the outside brightness, the vehicle control device further comprising a surrounding information acquisition unit configured to acquire surrounding information of the vehicle, wherein the control unit detects an inter-vehicle distance between the vehicle and a preceding vehicle traveling ahead of the vehicle, based on the surrounding information, and the control unit changes luminance of each of the plurality of display areas in accordance with the inter-vehicle distance, the vehicle control device further comprising a warning unit configured to output a warning, in a case where the inter-vehicle distance becomes equal to or shorter than a predetermined distance, wherein, when the warning is output, the control unit reduces the luminance of each of the plurality of display areas with a luminance change larger than a luminance change in a case of increasing the luminance of each of the plurality of display areas.

17. A vehicle control device that controls a vehicle, the vehicle control device comprising:

a luminance acquisition unit configured to acquire information of outside brightness of the vehicle; and a control unit configured to control, based on the outside brightness, luminance of a plurality of display areas including a first display area displayed by a first display unit for displaying a situation of the vehicle and a second display area displayed by a second display unit for displaying a situation of the vehicle, the second display area being displayed below the first display area, wherein in a case where the outside brightness is higher than a first threshold, the control unit suppresses luminance of the first display area in accordance with a decrease in the outside brightness, and in a case where the outside brightness is equal to or lower than the first threshold, the control unit suppresses luminance of the second display area in accordance with the decrease in the outside brightness, the vehicle control device further comprising a surrounding information acquisition unit configured to acquire surrounding information of the vehicle, wherein the control unit detects an inter-vehicle distance between the vehicle and a preceding vehicle traveling ahead of the vehicle, based on the surrounding information, and the control unit changes luminance of each of the plurality of display areas in accordance with the inter-vehicle distance, wherein in a case where the inter-vehicle distance is longer than a predetermined distance due to a braking operation that has been operated by an occupant of the vehicle, the control unit reduces the luminance of each of the plurality of display areas with a luminance change larger than a luminance change in a case of increasing the luminance of each of the plurality of display areas.

18. A non-transitory computer-readable storage medium that stores a program for causing a computer to execute an operation method for a vehicle control device for controlling a vehicle, the operation method comprising:

acquiring information of outside brightness of the vehicle; and controlling, based on the outside brightness, luminance of a plurality of display areas including a first display area displayed by a first display unit for displaying a situation of the vehicle and a second display area displayed by a second display unit for displaying a situation of the vehicle, the second display area being displayed below the first display area, wherein in a case where the outside brightness is higher than a threshold, the controlling suppresses luminance of the first display area in accordance with a decrease in the outside brightness, in a case where the outside brightness is equal to or lower than the threshold, the controlling suppresses luminance of the second display area in accordance with the decrease in the outside brightness, the plurality of display areas further include a third display area displayed by a third display unit, the third display area being disposed below the second display area and in a periphery in an inside of the vehicle, and controlling luminance of the third display area, based on the outside brightness, and in the case where the outside brightness is equal to or lower than a second threshold that is smaller than the first threshold, the luminance of the third display area is suppressed in accordance with the decrease in the outside brightness.

* * * * *